(12) United States Patent
Cline et al.

(10) Patent No.: US 6,572,768 B1
(45) Date of Patent: Jun. 3, 2003

(54) OIL FILTER APPARATUS

(75) Inventors: L. Steven Cline, Fayetteville, NC (US); Ledu Quoc Nguyen, Fayetteville, NC (US); John W. Wall, Holly Springs, NC (US); Allen B. Wright, Hope Mills, NC (US)

(73) Assignee: Arvin Technologies, Inc., Troy, MI (US)

( * ) Notice: Subject to any disclaimer, the term of this patent is extended or adjusted under 35 U.S.C. 154(b) by 0 days.

(21) Appl. No.: 10/105,586

(22) Filed: Mar. 25, 2002

(51) Int. Cl.[7] .......................... B01D 35/16; B01D 35/34
(52) U.S. Cl. .................. 210/236; 210/248; 210/428; 210/433.1; 210/440; 210/443; 210/454; 210/455; 210/457
(58) Field of Search ................................. 210/236, 248, 210/428, 433.1, 438, 440, 443, 454, 455, 457

(56) References Cited

U.S. PATENT DOCUMENTS 4,906,365 A * 3/1990 Baumann et al. ........... 210/238
5,589,060 A 12/1996 Gebert et al.
5,601,710 A * 2/1997 Yoon et al. ................. 210/232

FOREIGN PATENT DOCUMENTS

| DE | 43 31 598 A1 | 3/1995 |
| GB | 2 162 079 A | 1/1986 |
| WO | WO 01/12294 A1 | 2/2001 |

* cited by examiner

Primary Examiner—Matthew O. Savage
(74) Attorney, Agent, or Firm—Barnes & Thornburg

(57) ABSTRACT

An oil filter apparatus comprises a housing formed to include an interior region and an aperture, a drainage valve positioned in the interior region for movement relative to the housing between an opened position allowing oil to drain out of the interior region through the aperture and a closed position blocking drainage of oil out of the interior region through the aperture, a filter module positioned in the interior region to filter oil, a valve actuator coupled to the filter module, and an anti-rotation device positioned to block rotation of the filter module relative to the housing to guide the valve actuator into communication with the drainage valve to move the drainage valve to the closed position when the filter module is installed in the interior region.

20 Claims, 5 Drawing Sheets

OIL FILTER APPARATUS

BACKGROUND

The present disclosure relates to a filter apparatus, and particularly to a filter apparatus for filtering fluids for an engine. More particularly, the present disclosure relates to an oil filter apparatus for filtering engine oil.

Oil filters are used onboard vehicles and in other apparatus containing transport systems to remove unwanted solids or other contaminants from oil. Oil filters are provided to clean oil used in vehicle engines.

SUMMARY

An oil filter apparatus in accordance with the present disclosure comprises a housing formed to include an interior region and an aperture and a drainage valve. The drainage valve is positioned in the interior region for movement relative to the housing between an opened position allowing oil to drain out of the interior region through the aperture and a closed position blocking drainage of oil out of the interior region through the aperture. The oil filter apparatus includes a filter module positioned in the interior region to filter oil and a valve actuator coupled to the filter module. The oil filter apparatus includes an anti-rotation device positioned to block rotation of the filter module relative to the housing to guide the valve actuator into communication with the drainage valve to move the drainage valve to the closed position when the filter module is installed in the interior region.

In illustrative embodiments, the anti-rotation device includes an anti-rotation rib and a rib-receiving notch. The anti-rotation rib is coupled to the housing and positioned in the interior region. The rib-receiving notch is formed in the filter module. The anti-rotation rib is positioned within the rib-receiving notch to block rotation of the filter module relative to the housing to guide the valve actuator into communication with the drainage valve to move the drainage valve to the closed position when the filter module is installed in the interior region.

Additional aspects of the disclosure will become apparent to those skilled in the art upon consideration of the following detailed description of illustrative embodiments exemplifying the best mode as presently perceived.

BRIEF DESCRIPTION OF THE DRAWINGS

The detailed description particularly refers to the accompanying figures in which.

DETAILED DESCRIPTION OF THE DRAWINGS

Figures 1, 2:
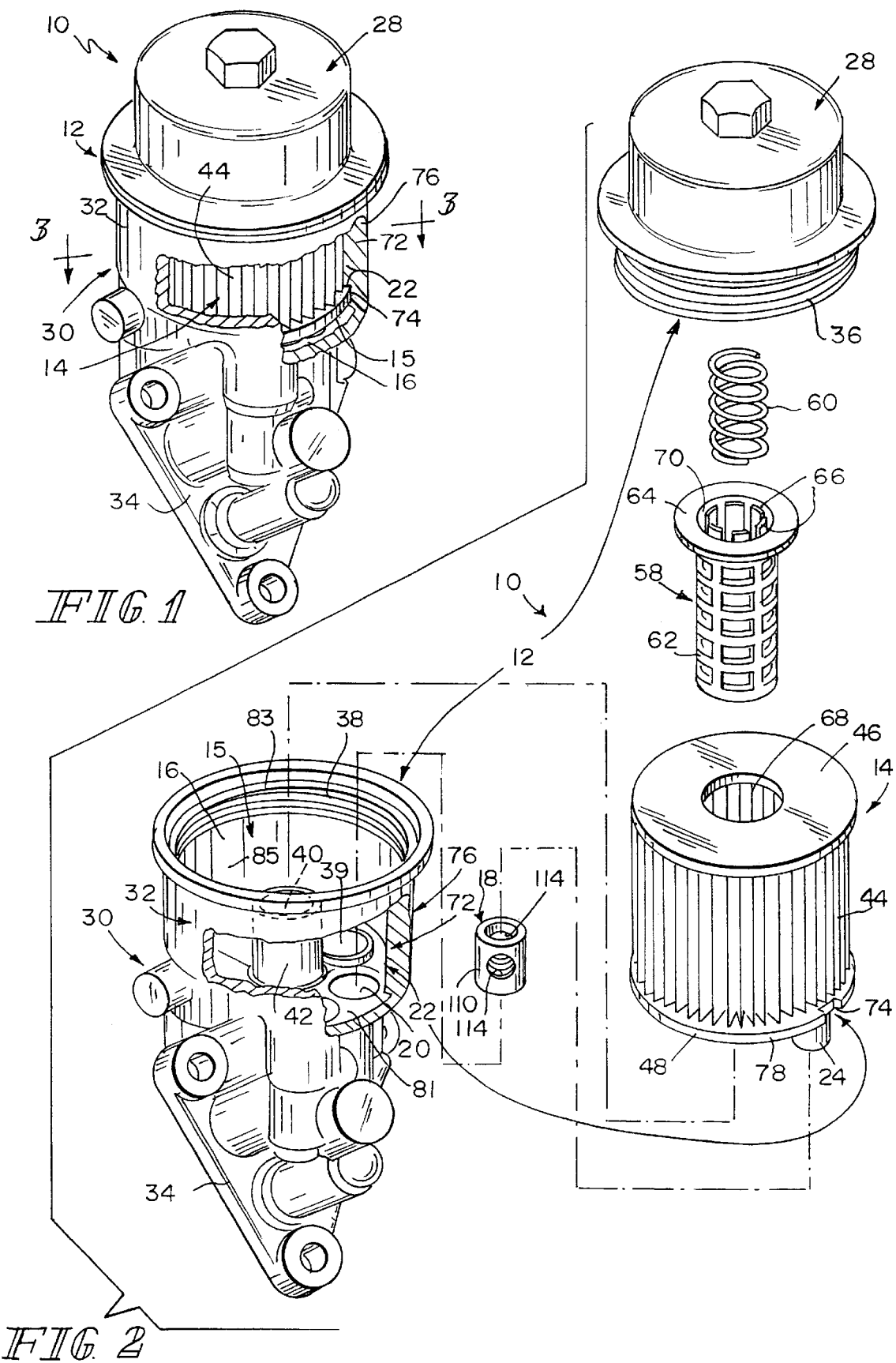
FIG. 1 is a perspective view of an oil filter apparatus with a portion of the oil filter housing broken away to show a filter module located in an interior region formed in the housing and to show a vertical anti-rotation rib appended to an interior wall of the housing and arranged to extend into a rib-receiving notch formed in the filter module to block rotation of the filter module about a vertical axis in the housing.
FIG. 2 is an exploded perspective view of components used to form the oil filter apparatus of FIG. 1 showing the vertical anti-rotation rib located in the interior region of the housing and showing the rib-receiving notch formed in an end cap included in the filter module and arranged to underlie a filter cartridge also included in the filter module.
Figure 2A:
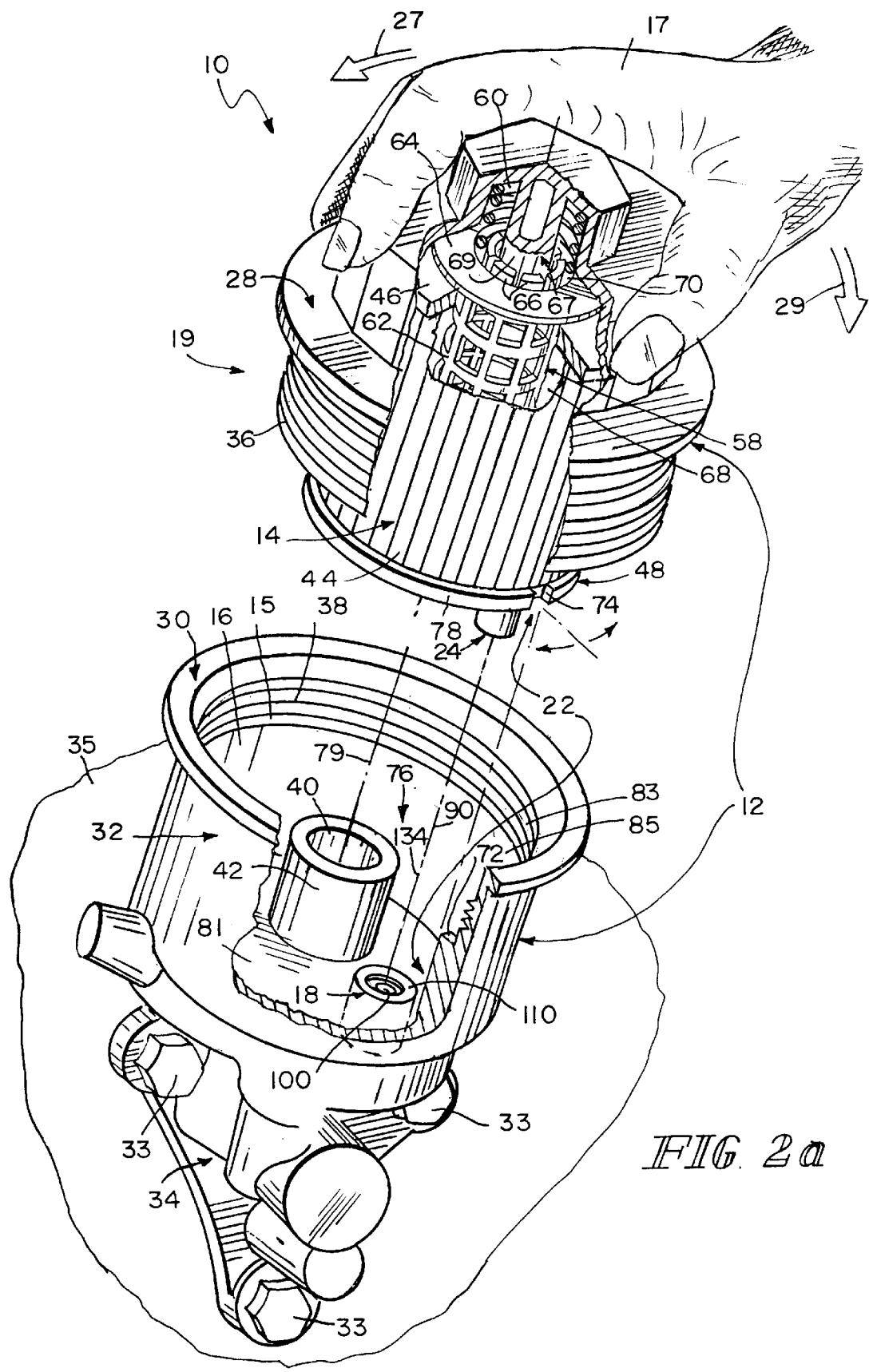
FIG. 2a is a perspective view showing the filter module coupled to a cover portion of the housing and a user gripping the cover portion to orient the rib-receiving notch relative to the anti-rotation rib so that a valve actuator coupled to the end cap formed to include the rib-receiving notch automatically lines up with a drainage valve of the oil filter apparatus when the cover portion is coupled to a base portion of the housing.

An oil filter apparatus 10 shown, for example, in FIGS. 1, 2, and 2a is configured to filter oil for a vehicle engine 11 or other oil-using system. Filter apparatus 10 includes a housing 12, an oil filter module 14 for filtering oil within an interior region 15 of housing 12, a quick-drain, drainage valve 18, and a valve actuator 24 coupled to oil filter module 14. Apparatus 10 includes an anti-rotation device 22 positioned to block rotation of filter module 14 relative to a bottom, base portion 30 of housing 12 to guide valve actuator 24 into communication with valve 18 to move valve 18 from an opened position (see FIGS. 3 and 7) allowing oil to drain from interior region 15 through a drainage aperture 26 to a closed position (see FIG. 4) blocking oil from flowing out of interior region 15 through drainage aperture 26 when filter module 14 is installed in interior region 15. Anti-rotation device 22 includes an anti-rotation rib 72 coupled to base portion 30 and a rib-receiving notch 74 formed in filter module 14 to receive anti-rotation rib 72.

Housing 12 includes a top, cover portion 28 and base portion 30, as shown, for example, in FIGS. 1, 2, and 2a. Cover portion 28 includes threads 36 for engaging corresponding threads 38 of base portion 30 to couple cover portion 28 to base portion 30. Cover portion 28 and base portion 30 cooperate to provide interior region 15.

Base portion 30 includes a receptacle portion 32 and a mounting flange portion 34. Receptacle portion 32 receives filter module 14 in a filter chamber 16 of interior region 15 and valve 18 in a valve chamber 20 of interior region 15. Mounting flange portion 34 receives bolts 33 to couple filter apparatus 10 to an engine block 35 of engine 11.

Receptacle portion 32 includes a side wall 76 and a bottom wall 81, as shown, for example, in FIGS. 2 and 2a.

Side wall 76 surrounds filter module 14 and includes an upper, threaded portion 83 formed to include threads 38 and a lower, non-threaded portion 85. Rib 72 is coupled to and extends radially inwardly from non-threaded portion 85. Rib 72 is formed monolithically with non-threaded portion 85 and extends between threaded portion 83 and bottom wall 81.

Bottom wall 81 is formed to include valve chamber 20, drainage aperture 26, and an inlet passageway 39. Valve 18 is coupled to bottom wall 81 and positioned within valve chamber 20. Inlet passageway 39 receives unfiltered oil from engine 11 and introduces it into filter chamber 16. Receptacle portion 32 further includes an outlet post 42 coupled to bottom wall 81 for engaging an annular seal 54 of filter module 14. Receptacle portion 32 is formed to include an outlet passageway 40 for discharging filtered oil from filter chamber 16. Outlet post 42 provides part of outlet passageway 40.

Figure 3:
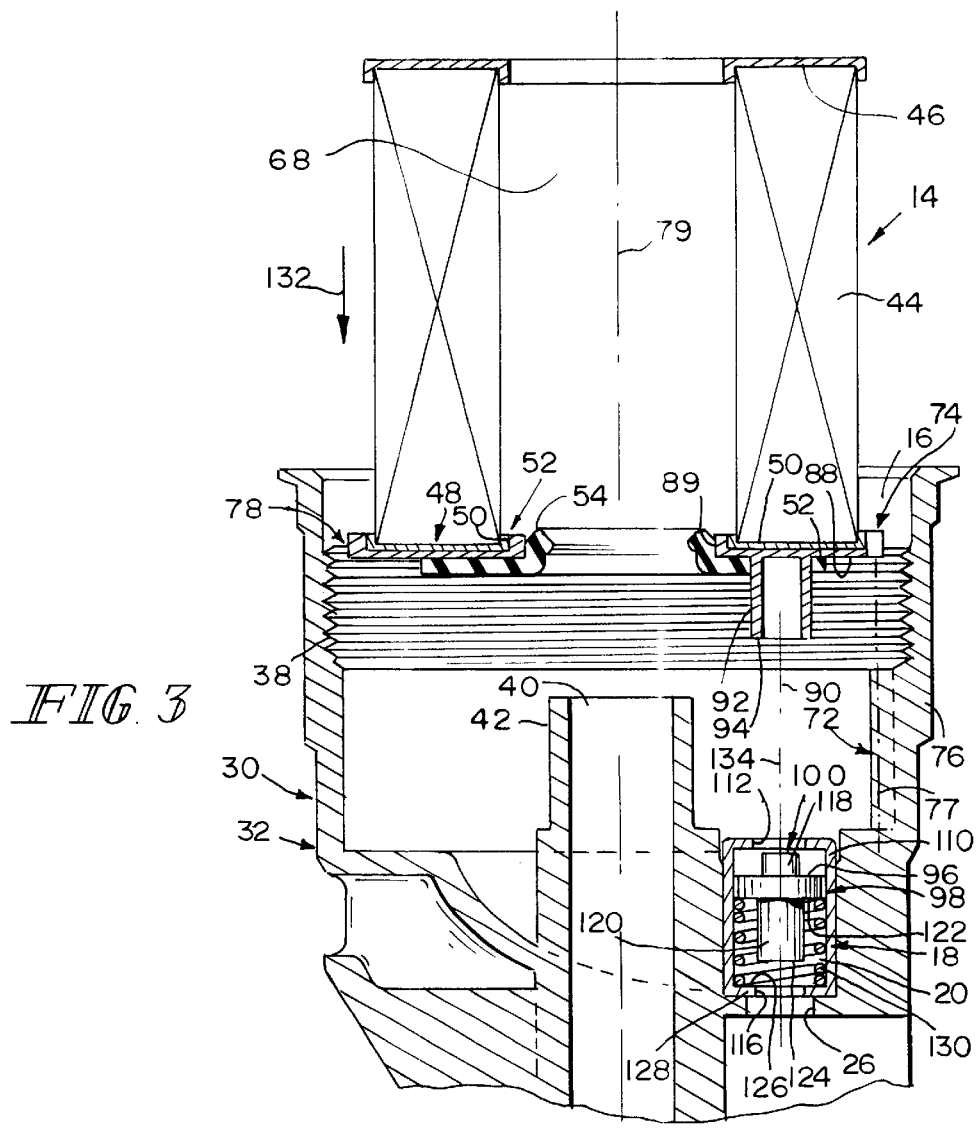
FIG. 3 is a sectional view taken along line 3—3 of FIG. 1 showing movement of the filter module into the base portion of the filter housing during assembly of the oil filter apparatus and showing orientation of the filter module in the interior region of the housing to cause an upper end of the vertical anti-rotation rib to extend into the rib-receiving notch formed in the lowermost end cap in the filter module.

Filter module 14 includes filter media 44 for filtering contaminants from oil, a generally annular first, top end cap 46, and a generally annular second, bottom end cap 48, as shown, for example, in FIGS. 2, 2a, and 3. Illustratively, end caps 46, 48 are made of plastics material and filter media 44 is coupled to end caps 46, 48 by non-contact, infrared bonding or other bonding processes, such as hot-plate bonding.

Filter module 14 further includes a center tube 58, as shown, for example, in FIGS. 2 and 2a. Center tube 58 includes a body 62, an annular top flange 64 coupled to a top portion of body 62, and a ring of flexible fingers 66 for engaging an engagement plug 67 of cover portion 28 in a notch 69 of plug 67. Flange 64 rests on a top surface of top end cap 46 to position body 62 within filter module 14 in a filtered oil chamber 68.

Center tube 58 is formed to include an annular slot 70 for receiving a bottom portion of a bias element 60 such as a spring. An upper portion of bias element 60 surrounds engagement plug 67. Bias element 60 biases filter module 14 downwardly toward valve 18. The spring constant of bias element 60 is greater than the spring constant of a valve spring 130 of valve 18 so that a plunger 100 of valve 18 is urged to the closed position when cover portion 28 is coupled to base portion 30. Further details of center tube 58, spring 60, and engagement plug 67 are disclosed in International Publication Number WO 01/12294 A1 and U.S. patent application Ser. No. 09/637,187, the disclosures of which are hereby incorporated by reference herein.

Bottom end cap 48 includes an inner portion 50 and an outer portion 52 covering inner portion 50, as shown, for example, in FIGS. 3–8. Seal 54 is coupled to outer portion 52 for sealing against outlet post 42 to block oil from flowing between outlet post 42 and bottom end cap 48. Outer portion 52 of end cap 48 includes an annular peripheral flange 78, as shown, for example, in FIGS. 2–8. Flange 78 is formed to include notch 74.

Figure 5:
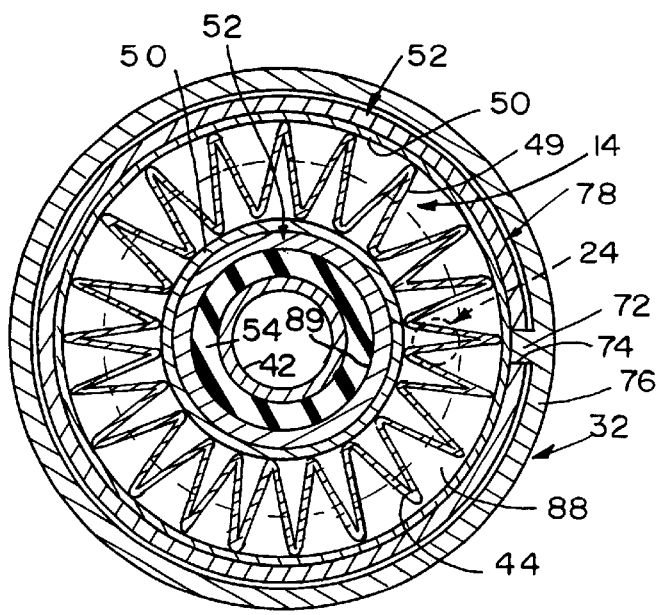
FIG. 5 is a sectional view taken along line 5—5 of FIG. 4 showing the anti-rotation rib included in the filter housing extending radially inwardly into the rib-receiving notch formed in the end cap of the filter module.
Figure 6:
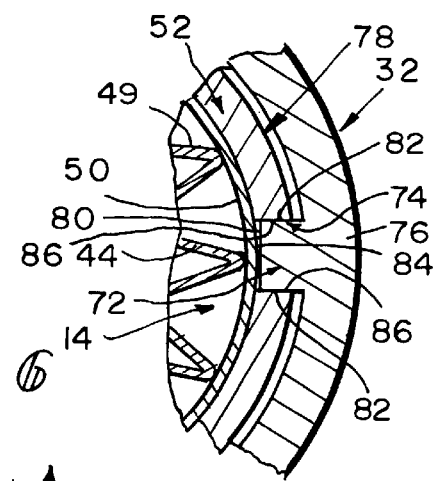
FIG. 6 is an enlarged view of a portion of FIG. 5.

Rib 72 engages notch 74 during installation of filter module 14 and operation of apparatus 10, as shown, for example, in FIGS. 5 and 6. In the area of notch 74, flange 78 includes a radially outwardly facing back wall 84 and side walls 86 facing one another. Back wall 84 and side walls 86 cooperate to provide notch 74. Rib 72 includes a radially inwardly facing front wall 80 and opposite side walls 82 facing away from one another. Front wall 80 and back wall 84 slidably engage one another and side walls 82 slidably engage corresponding side walls 86. Rib 72 and notch 74 thus cooperate to provide means for blocking rotation of filter module 14 relative to the base portion 30 to guide valve actuator 24 into communication with valve 18 to position valve 18 in the closed position when filter module 14 is installed in interior region 15.

Valve actuator 24 is coupled to and extends downwardly from a downwardly facing surface 88 of outer portion 52 of bottom end cap 48, as shown, for example, in FIGS. 3, 4, 7, and 8. Valve actuator 24 is positioned between radially outer flange 78 and a radially inner flange 89 of outer portion 52. Valve actuator 24 is illustrated as having a cylindrical shape and includes a side wall 92 extending downwardly from surface 88. Side wall 92 includes an end face 94 for engaging a top surface 96 of a disk 98 of plunger 100 of valve 18.

Figure 7:
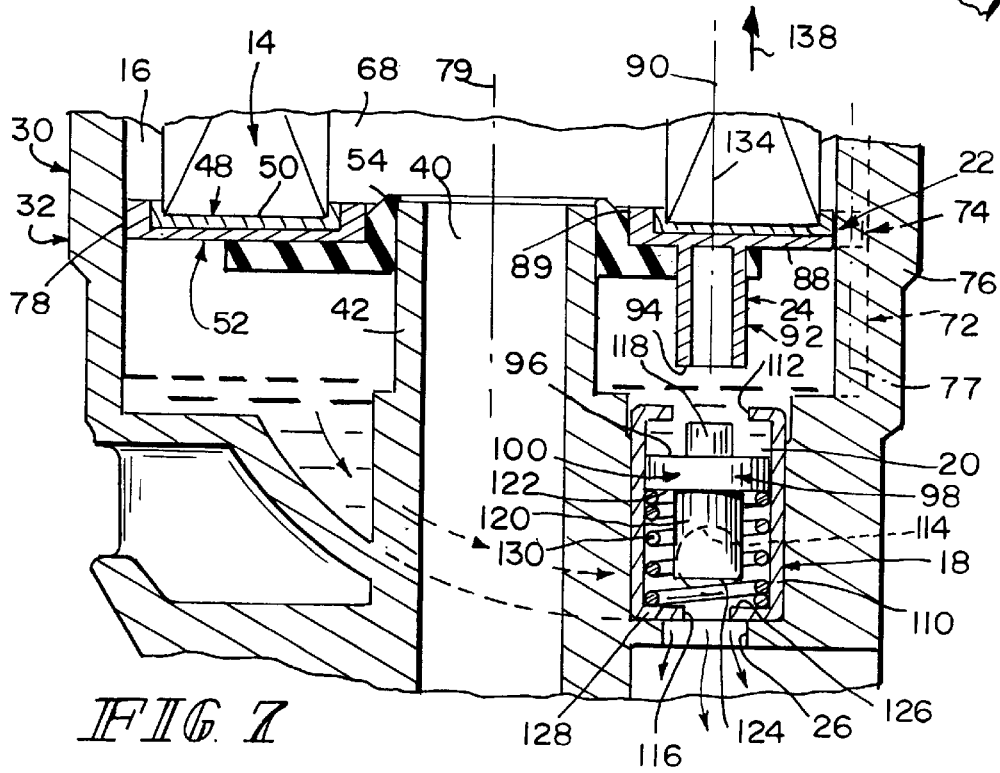
FIG. 7 is a sectional view similar to FIG. 4 showing opening of the drainage valve to drain oil stored in a chamber formed in the housing in response to upward movement of the filter module in the housing.
Figure 8:
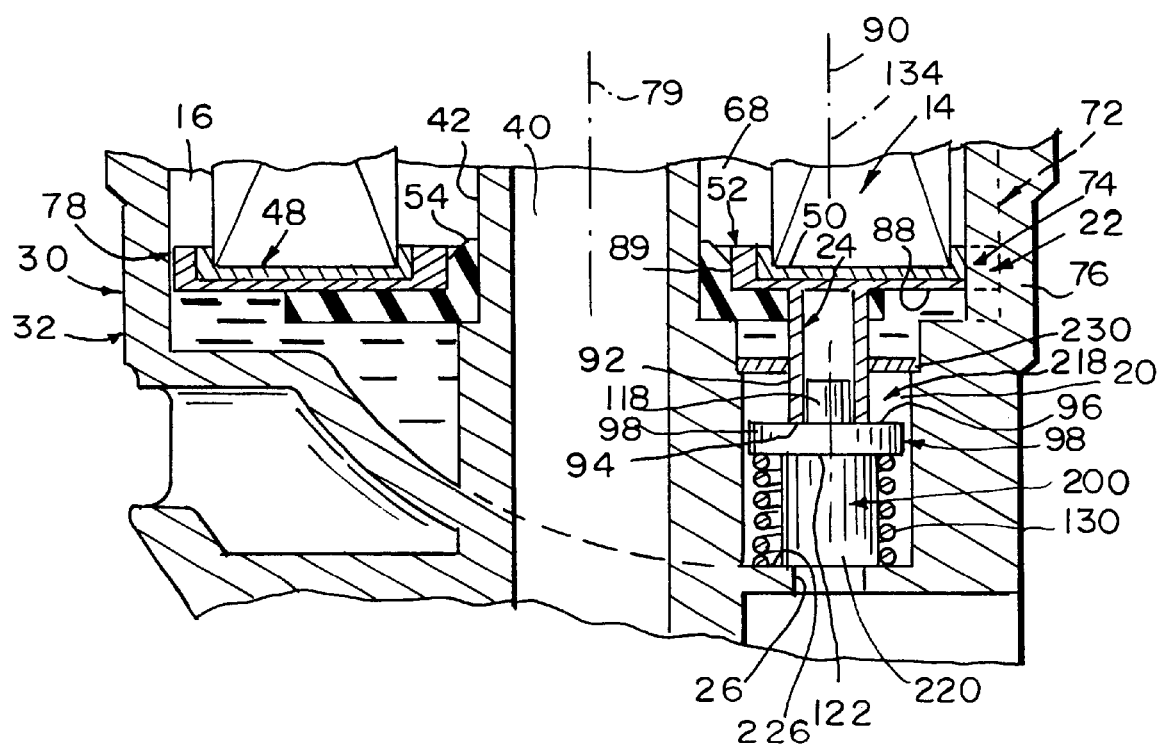
FIG. 8 is a sectional view similar to FIG. 4 showing another embodiment of the drainage valve underlying the filter module.

Valve actuator 24 has a longitudinal axis 90 that is parallel to a central longitudinal axis 79 of filter module 14 and a longitudinal axis 77 of rib 72 (see FIGS. 3 and 7). Valve actuator 24 is a post that provides means for actuating valve 18.

Figure 4:
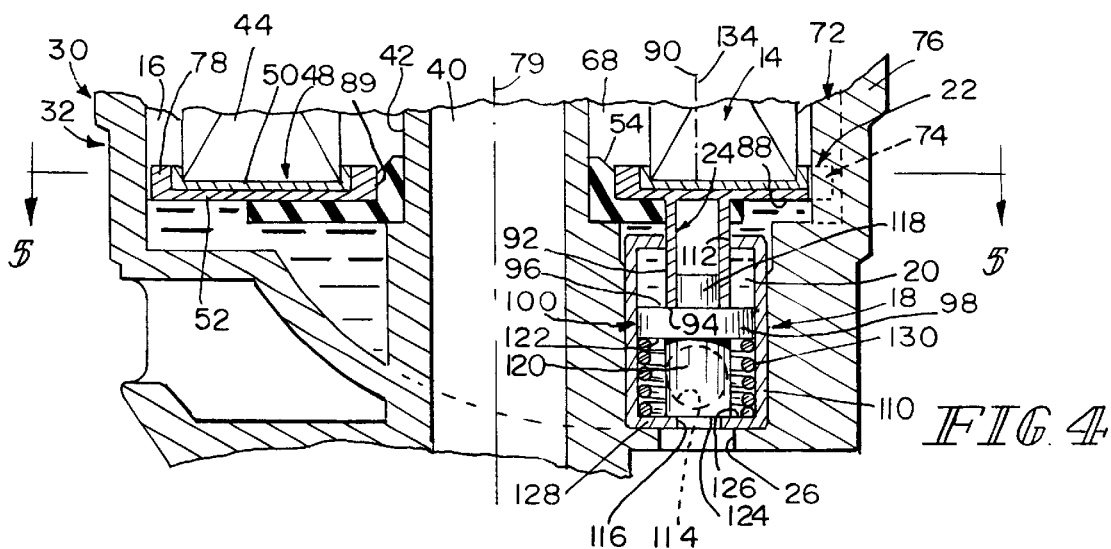
FIG. 4 is an enlarged sectional view similar to FIG. 3 showing placement of a lower end of the vertical anti-rotation rib into the rib-receiving notch to block rotation of the filter module about a vertical axis extending through the oil filter apparatus once the filter module has been moved downwardly to a fully installed position in the housing to communicate with the drainage valve underlying the filter module.

Drainage valve 18 includes a casing 110, plunger 100, and valve spring 130, as shown, for example, in FIGS. 3, 4, and 7. Plunger 100 and valve spring 130 are housed within casing 110 in the embodiment shown in FIGS. 3, 4, and 7. Casing 110 is formed to include a top aperture 112 for receiving valve actuator 24 within casing 110, side inlet apertures 114 for introducing oil within casing 110, and a bottom outlet aperture 116 for draining oil from casing 110.

Plunger 100 includes disk 98, a top stem 118 coupled to and extending upwardly from disk top surface 96, and a bottom stem 120 coupled to and extending downwardly from a bottom surface 122 of disk 98. A bottom surface 124 of bottom stem 120 engages a valve seat 126 of a bottom lip 128 of casing 110 to block oil from flowing through bottom outlet aperture 116 and drainage aperture 26 of housing 12. Spring 130 of valve 18 engages bottom lip 128 and bottom surface 122 of disk 98 to bias plunger 100 away from valve seat 126. Valve actuator 24 extends through top aperture 112 to engage plunger 100, as shown, for example, in FIG. 4. When plunger 100 engages valve seat 126, side wall 92 of valve actuator 24 surrounds top stem 118 and end face 94 engages top surface 96 of disk 98 in the embodiment shown in FIG. 4.

Valve actuator 24 is useful with a variety of drainage valves. For example, valve actuator 24 is also useful with a drainage valve 218, as shown, for example, in FIG. 8. Valve 218 is similar to valve 18, except as otherwise noted, so that like reference numerals refer to like components. Valve 218 is without casing 110 of valve 18. A plunger 200 of valve 218 has a top stem 118, a disk 98, and a bottom stem 220 to engage a valve seat 226 of housing 12. Spring 130 biases plunger 200 away from valve seat 226. An annular retainer ring 230 is coupled to receptacle portion 32 to maintain valve 218 within valve chamber 20.

During assembly of apparatus 10, filter module 14 is coupled to cover portion 28 as it is placed over center tube 58. Filter module 14, cover portion 28, and bias element 60 cooperate to provide a filter module unit 19, as shown, for example, in FIG. 2a. A user 17 grips cover portion 28 and rotates filter module unit 19 in a direction indicated by either arrow 27 or arrow 29 to position rib 72 within notch 74. Positioning rib 72 within notch 74 automatically aligns valve actuator 24 and plunger 100 along an axis 134. As user 17 advances filter module 14 into filter chamber 16 in a direction indicated by arrow 132 in FIG. 3, rib 72 and notch 74 cooperate to guide valve actuator 24 along axis 134 so that filter module 14 and, thus, valve actuator 24 do not rotate relative to base portion 30. Valve actuator 24 is thus guided to extend through aperture 112 into engagement with plunger 100 to move plunger 100 against a biasing force generated by valve spring 130 so that plunger 100 seats properly on valve seat 126 and is not "canted" or "misaligned" (which could lead to incomplete engagement with valve seat 126). As cover portion 28 is screwed onto base portion 30, rib 72 and notch 74 continue to block rotation of filter module 14 and valve actuator 24 relative to base portion 30.

Filter module 14 is removed from base portion 30 by withdrawing filter module unit 17 manually in a direction indicated by arrow 138 in FIG. 7. Valve spring 130 forces plunger 100 away from valve seat 126 to drain oil from interior region 15 through drainage aperture 26 when filter module 14 is removed from interior region 15. During drainage, oil flows through side inlet apertures 114 and bottom outlet aperture 116 of casing 110.

What is claimed is:

1. An oil filter apparatus comprising
   a housing formed to include an interior region and an aperture,
   a drainage valve positioned in the interior region for movement relative to the housing between an opened position allowing oil to drain out of the interior region through the aperture and a closed position blocking drainage of oil out of the interior region through the aperture,
   a filter module positioned in the interior region to filter oil in an installed position,
   a valve actuator coupled to the filter module, and
   an anti-rotation device positioned to block rotation of the filter module relative to the housing to guide the valve actuator into communication with the drainage valve to move the drainage valve to the closed position when the filter module is installed in the interior region in said installed position.

2. The oil filter apparatus of claim 1, wherein the anti-rotation device includes an anti-rotation rib coupled to the housing and positioned in the interior region and a rib-receiving notch formed in the filter module and the anti-rotation rib is positioned within the rib-receiving notch to block rotation of the filter module relative to the housing to guide the valve actuator into communication with the drainage valve to position the drainage valve in the closed position when the filter module is installed in the interior region.

3. The oil filter apparatus of claim 2, wherein the housing includes a base portion adapted to be coupled to an engine block and a removable cover portion cooperating with the base portion to provide the interior region and the anti-rotation rib and the drainage valve are coupled to the base portion.

4. The oil filter apparatus of claim 3, wherein the base portion includes a side wall surrounding the filter module and the anti-rotation rib is coupled to the side wall.

5. The oil filter apparatus of claim 4, wherein the side wall includes a threaded portion and a non-threaded portion and the anti-rotation rib is coupled to the non-threaded portion.

6. The oil filter apparatus of claim 4, wherein the anti-rotation rib extends radially inwardly from the side wall to engage the rib-receiving notch.

7. The oil filter apparatus of claim 2, wherein the filter module has a longitudinal axis, the valve actuator has a longitudinal axis, and the anti-rotation rib has a longitudinal axis parallel to the longitudinal axis of the filter module and the longitudinal axis of the valve actuator.

8. The oil filter apparatus of claim 2, wherein the filter module includes an end cap and the rib-receiving notch is formed in the end cap.

9. The oil filter apparatus of claim 8, wherein the end cap includes an annular peripheral flange and the annular peripheral flange is formed to include the rib-receiving notch.

10. The oil filter apparatus of claim 9, wherein the annular peripheral flange includes a first side wall, a second side wall, and a back wall coupled to the first side wall and the second side wall and facing radially outwardly, the first side wall and the second side wall face one another, and the first side wall, the second side wall, and the back wall cooperate to provide the rib-receiving notch.

11. The oil filter apparatus of claim 10, wherein the filter module includes filter media and the back wall is positioned radially outwardly from the filter media.

12. The oil filter apparatus of claim 10, wherein the anti-rotation rib includes a first side wall, a second side wall, and a front wall facing radially inwardly, the first side wall and the second side wall of the anti-rotation rib face away from one another, the first side wall of the anti-rotation rib engages the first side wall of the rib-receiving notch, the second side wall of the anti-rotation rib engages the second side wall of the rib-receiving notch, and the front wall of the anti-rotation rib engages the back wall of the rib-receiving notch.

13. The oil filter apparatus of claim 1, wherein the housing is formed to include a filter chamber and a valve chamber, the filter module and the anti-rotation device are positioned in the filter chamber, the drainage valve is positioned in the valve chamber, and the valve actuator is a post extending from the filter chamber into the valve chamber to engage the drainage valve.

14. The oil filter apparatus of claim 13, wherein the anti-rotation device includes an anti-rotation rib coupled to the housing and positioned in the filter chamber and a rib-receiving notch formed in the filter module and positioned in the filter chamber and the anti-rotation rib is positioned within the rib-receiving notch to block rotation of the filter module relative to the housing to guide the valve actuator into communication with the drainage valve to position the drainage valve in the closed position when the filter module is installed in the interior region.

15. An oil filter apparatus comprising
   a housing formed to include an interior region and an aperture,
   a drainage valve positioned in the interior region for movement relative to the housing between an opened position allowing oil to drain out of the interior region through the aperture and a closed position blocking drainage of oil out of the interior region through the aperture,
   a filter module positioned in the interior region to filter oil,
   a valve actuator coupled to the filter module, and
   an anti-rotation rib coupled to the housing and positioned in the interior region, the filter module being formed to include a rib-receiving notch, the anti-rotation rib being positioned within the rib-receiving notch to block rotation of the filter module relative to the housing to guide the valve actuator into communication with the drainage valve to position the drainage valve in the closed position when the filter module is installed in the interior region.

16. The oil filter apparatus of claim 15, wherein the filter module includes an end cap, the valve actuator is coupled to the end cap, and the end cap is formed to include the rib-receiving notch.

17. The oil filter apparatus of claim 15, wherein the housing includes a base portion and a removable cover portion cooperating with the base portion to provide the interior region, the drainage valve and the anti-rotation rib are coupled to the base portion.

18. The oil filter apparatus of claim 17, wherein the base portion includes a side wall and a bottom wall, the side wall surrounds the filter module, the anti-rotation rib is coupled to the side wall, and the drainage valve is coupled to the bottom wall.

19. The oil filter apparatus of claim 18, wherein the housing is formed to include a filter chamber and a valve chamber, the filter module is positioned within the filter chamber, the anti-rotation rib extends radially inwardly from the side wall into the filter chamber to engage the rib-receiving notch, the drainage valve is positioned within the valve chamber which is formed in the bottom wall, and the valve actuator extends from the filter chamber into the valve chamber to engage the drainage valve.

20. An oil filter apparatus comprising a housing formed to include an interior region and an aperture, a drainage valve positioned in the interior region for movement relative to the housing between an opened position allowing oil to drain out of the interior region through the aperture and a closed position blocking drainage of oil out of the interior region through the aperture, a filter module positioned in the interior region to filter oil, a valve actuator coupled to the filter module, and means for blocking rotation of the filter module relative to the housing to guide the valve actuator into communication with the drainage valve to position the drainage valve in the closed position when the filter module is installed in the interior region.

* * * * *